US008206571B2

(12) United States Patent
Clarke

(10) Patent No.: US 8,206,571 B2
(45) Date of Patent: Jun. 26, 2012

(54) FORMATION OF [18F] FLUORIDE COMPLEXES SUITABLE FOR [18F] FLUORINATIONS

(75) Inventor: Alan Peter Clarke, Oslo (NO)

(73) Assignee: GE Healthcare Limited, Little Chalfont (GB)

( * ) Notice: Subject to any disclaimer, the term of this patent is extended or adjusted under 35 U.S.C. 154(b) by 735 days.

(21) Appl. No.: 12/306,273

(22) PCT Filed: Jun. 26, 2007

(86) PCT No.: PCT/GB2007/002385
§ 371 (c)(1), (2), (4) Date: Dec. 23, 2008

(87) PCT Pub. No.: WO2008/001072
PCT Pub. Date: Jan. 3, 2008

(65) Prior Publication Data

US 2009/0242421 A1 Oct. 1, 2009

Related U.S. Application Data

(60) Provisional application No. 60/816,709, filed on Jun. 27, 2006.

(51) Int. Cl.

| | |
|---|---|
| ***C25B 15/00*** | (2006.01) |
| ***C25B 11/04*** | (2006.01) |
| ***C25B 3/08*** | (2006.01) |
| ***C25C 7/00*** | (2006.01) |
| *C02F 1/461* | (2006.01) |
| *G21C 1/00* | (2006.01) |
| *C25C 1/24* | (2006.01) |

(52) U.S. Cl. ..................... 205/350; 204/275.1; 204/291; 422/159; 205/430; 205/619; 205/625; 205/742

(58) Field of Classification Search ........................ None
See application file for complete search history.

(56) References Cited

U.S. PATENT DOCUMENTS

| | | | | |
|---|---|---|---|---|
| 3,687,829 | A | 8/1972 | Factor | |
| 5,208,154 | A * | 5/1993 | Weaver et al. | 435/176 |
| 5,770,030 | A | 6/1998 | Hamacher et al. | |
| 7,192,556 | B2 * | 3/2007 | Hamacher et al. | 422/505 |
| 2005/0178659 | A1 * | 8/2005 | Takahashi et al. | 204/291 |
| 2005/0232861 | A1 * | 10/2005 | Buchanan et al. | 424/1.11 |

FOREIGN PATENT DOCUMENTS

| | | |
|---|---|---|
| EP | 0798307 | 10/1997 |

OTHER PUBLICATIONS

Jewett et al, "Multiphase Extraction: Rapid Phase-Transfer of [18F]Fluoride Ion for Nucleophilic Radiolabeling Reactions," Appl. Radiat. Isot., vol. 39, No. 11, pp. 1109-1111, 1988.*

Hamacher et al., "Electrochemical cell for separation of [18F]fluoride from irradiated 18O-water and subsequent no carrier added nucleophilic fluorination," Applied Radiation and Isotopes 56 (2002), pp. 519-523.*

Jewett et al., "Multiphase Extraction: Rapid Phase-Transfer of [18F]Fluoride Ion for Nucleophilic Radiolabeling Reactions," Appl. Radiation Isotopes, vol. 39, No. 11, pp. 1109-1111, 1988.*

Hamacher, K. et.al. "Electrochemical cell for separation of [<18>F]fluoride from irradiated <18>0-water and subsequent no carrier added nucleophilic fluorination" Applied Radiation and Isotopes, Esevier, Oxford, GB, vol. 56, No. 3, Mar. 2002, pp. 519-523.

Jewitt, D.M. et.al. "Multiphase extraction: rapid phase-transfer of [<18>F]fluoride ion for nucleophilic radiolabeling reactions" Applied Radiation and Isotopes UK, vol. 39, No. 11, 1988, pp. 1109-1111.

Langen, et.al. "0-(2-[<18>F]fluorethyl)-1-tyrosine: uptake mechanisms and clinical applications" Nuclear Medicine and Biology, Elsevier, NY, US, vol. 33, No. 3 Apr. 2006, pp. 287-294.

PCT/gb2007/002385 Int'l Search Report/Written Opinion dated Nov. 2007.

* cited by examiner

*Primary Examiner* — In Suk Bullock
*Assistant Examiner* — Jennifer Wecker
(74) *Attorney, Agent, or Firm* — Yonggang Ji

(57) ABSTRACT

The present invention claims a method for forming [$^{18}$F] fluoride complexes suitable for performing radio-labelling reactions to generate [$^{18}$F] fluorinated species. The present invention also provides for an apparatus for forming [$^{18}$F] fluoride complexes suitable for performing radio-labelling reactions to generate [$^{18}$F] fluorinated species. Kit claims for formation of [$^{18}$F] fluoride complexes suitable for performing radio-labelling reactions to generate [$^{18}$F] fluorinated species are also provided.

22 Claims, No Drawings

FORMATION OF [18F] FLUORIDE COMPLEXES SUITABLE FOR [18F] FLUORINATIONS

This application is a filing under 35 U.S.C. 371 of international application number PCT/GB2007/002385, filed Jun. 26, 2007, which claims priority to application No. 60/816,709 filed Jun. 27, 2006, in the United States the entire disclosure of which is hereby incorporated by reference.

FIELD OF THE INVENTION

The present invention relates to a novel method for forming [$^{18}$F] fluoride complexes suitable for performing radio-labelling reactions to generate [$^{18}$F] fluorinated species for use as imaging agents. The present invention also relates to an apparatus for making [$^{18}$F] fluoride complexes suitable for performing radio-labelling reactions to generate [$^{18}$F] fluorinated species. The present invention further relates to kits for making [$^{18}$F] fluoride complexes suitable for performing radio-labelling reactions to generate [$^{18}$F] fluorinated species.

BACKGROUND OF THE INVENTION

The first major step of nucleophilic radiofluorination is drying the aqueous [$^{18}$F] fluoride which is commonly performed in the presence of a phase-transfer catalyst under azeotropic evaporation conditions (Coenen et al., *J. Labelled Compd. Radiopharm.,* 1986, vol. 23, pgs. 455-467). [$^{18}$F] fluoride dissolved in the target water is often adsorbed on an anion exchange resin and eluted, for example, with a potassium carbonate solution wherein the eluting carbonate solution contains the cryptand which complexes the fluoride to form the cryptate complex. (Schlyer et al., *Appl. Radiat. Isot.,* 1990, vol. 40, pgs. 1-6). The subsequent azeotropic drying of a cryptate, which is a cage-like agent, is generally performed under reduced pressure which requires additional technical equipment. One cryptand that is available commercially is 4,7,13,16,21,24-hexaoxa-1,10-diazabicyclo [8,8,8] hexacosan, with the tradename Kryptofix 222. A cryptand is a cage-like agent that has three ether ribs joining the nitrogens at each end. Alkali metals can be held very strongly inside the cage. Cryptands and other macrocyclic complexing agents are known as the "crown" ethers that consist of large puckered rings held together by several ether linkages.

It has been noted that such a complexing agent should be adsorbed at the site of the electrodes and furthermore, these agents could furnish the electrochemist with a useful cationic adsorbate, with a negative desorption potential. Pospisil et al. has demonstrated that a crown complex of $T1^+$ is adsorbed at a dropping mercury electrode. (Pospisil et al., *J. Electroanal. Chem.,* 1973, vol. 46, pg. 203). Pospisil et al. and Britz et al. demonstrated the use of complex adsorption in the electrosynthesis of tetraethyl lead. (Britz et al., *Electrochem. Acta,* 1968, vol. 13, pg. 347).

Another useful property of alkali metal ion complexes with cryptands is that the complex is reduced at mercury at much more negative potentials than the uncomplexed ion. This has been examined by Peter and Gross who found a potential shift for the $K^+$ complex of about −1V. (Peter et al., *J. Electroanal. Chem.,* 1974, vol. 53. pg. 307).

In Hamacher et al., an electrochemical recovery of n.c.a. [$^{18}$F] fluoride in dipolar aprotic solvents and solutions of phase transfer catalyst is discussed. (Hamacher et al., *Appl. Radiat. Isot.,* 2002, vol. 56, pgs. 519-523). This disclosed recovery process allows the use of a specifically designed electrochemical cell as a reaction vessel for n.c.a. nucleophilic $^{18}$F-fluorinations subsequent to [$^{18}$F] fluoride deposition. In other words, Hamacher et al. uses an electrochemical cell within a chamber that comprises two electrodes across which an electric field is applied. The [$^{18}$F] fluoride anions are adsorbed onto the surface of the anode while the [$^{18}$O] water is flushed from the electrode chamber. Hamacher et al. further conclude that a specifically designed electrochemical cell is generally useful for n.c.a. nucleophilic $^{18}$F-radiotracer syntheses. Especially in the case of base labeled products like butyrophenones, the electrochemical cell allows cryptate catalyzed $^{18}$F-fluorination in the presence of weak basic, less nucleophilic salts like potassium oxalate or triflate.

It is important to note here that a cryptand is a phase-transfer agent used to improve the solubility of [$^{18}$F] fluoride in non-aqueous environments and that a [$^{18}$F] fluorinated species defined herein comprises chemical or biological [$^{18}$F] fluorinated compounds.

There is a need for creating an electrochemical radio-labelling approach that can increase the yield of a [$^{18}$F] fluorinated species by up to 20% more than previous methods from the use of a electrochemical cell whereby a conducting polymer-modified electrode is combined with an anhydrous solvent where the polymer electrode is switched to a reducing potential and all retained anions are expelled from the polymer matrix and thereafter a phase transferring agent is combined with said anhydrous solvent. Moreover, the potential needed to oxidise the polymer will only be ca. +2 V (versus, for example, a silver-silver chloride reference electrode). The positive charge density at the polymer electrode will drive fluoride ions towards the oxidised polymer electrode far more than if it was an unmodified electrode. In other words, a lower potential is preferred to achieve the same level of fluoride adsorption. Furthermore, the modifying polymer layer masks the electrode surface and so precursors are unlikely to be degraded at the electrode surface.

Discussion or citation of a reference herein shall not be construed as an admission that such reference is prior art to the present invention.

SUMMARY OF THE INVENTION

In view of the needs of the prior art, the present invention provides for a method of preparing a cryptate [$^{18}$F] fluoride complexes in order to radiolabel [$^{18}$F] fluorinated species to be viewed through an imaging agent such as Positron Emmision Tomography ("PET"). The cryptate [$^{18}$F] fluoride complex is generated via layers of redox or conducting layers of polymer-modified electrode surfaces wherein one electrode is modified within the electrochemical cell. The modifying layer adsorbs (or ion-exchanges) fluoride in the polymer layer when an oxidising potential is applied to the electrode within the electrochemical cell. The fluoride is then ejected from the polymer layer into a solution containing the cryptand thus forming the cryptate [$^{18}$F] fluoride complex.

Unlike previous methods wherein the [$^{18}$F] nucleophilic fluoride anions are adsorbed or taken up onto the surface of the electrode of positive polarity while the [$^{18}$O] water is flushed from the electrode cell, the present invention utilizes alternative electrode materials that can be tailored to inhibit electrochemical reactions with precursors. The different oxidation states of the modifying polymer layer either entrap or eject fluoride from the polymer. The potential needed in the cell is therefore the potential needed to change the oxidation state of the polymer layer. Additionally, the polymer layer will probably inhibit unwanted side reactions of precursors.

Furthermore, unlike previous methods, the present invention demonstrates fluorination reactions within the electrochemical cell and then uses the electrodes or a separate modified electrode, other than the modified electrode inside of the electrochemical cell, to selectively adsorb, desorb, or degrade impurities resulting from unwanted reactions.

In one embodiment of the present invention a method for making [$^{18}$F] fluoride complexes comprises:

loading [$^{18}$O] water containing [$^{18}$F] fluoride into an electrochemical cell whereby redox polymers or a conducting polymer-modified electrode (wherein the electrode is coated with the polymer) is held at anodic potentials wherein the anions present will be retained on said conducting polymer-electrode. It is important to point out here that the conducting polymers are inherently conducting, whereas the redox polymers have metal centres incorporated along the polymer backbone and electrons hop through them in the metal centres. Both the conducting and redox polymers are made of two very different types of materials, but they both would perform the same function here—namely entrapping and ejecting fluoride.

It is also important to note that there are two types of redox polymers: Those like poly(vinylferrocene) which have a redox group as part of each monomer unit; and those that are simply non-electroactive ion-exchange polymers that have charged metal complexes electrostatically incorporated into them.

The present invention further comprises washing the aforementioned electrochemical cell with an anhydrous solvent; thereafter switching the polymer electrode to a reducing potential (the reducing potential depends on the solvent, the electrode configuration, and whether it is a 2-electrode or 3-electrode cell being used) and all retained anions are expelled from the polymer matrix; next a phase transferring agent is combined with said anhydrous solvent to form the [$^{18}$F] fluoride complex is disclosed.

Still a further embodiment encompasses an apparatus for making [$^{18}$F] fluoride complexes in order to radiolabel to [$^{18}$F] fluorinated species. This is achieved by:

loading [$^{18}$O] water containing [$^{18}$F] fluoride into an electrochemical cell whereby a conducting polymer or a redox-polymer-modified electrode is held at anodic potentials wherein the anions present will be retained on said conducting polymer-electrode;

washing said electrochemical cell with an anhydrous solvent; next switching said polymer electrode to a reducing potential and all retained anions are expelled from the polymer matrix; then finally combining a phase transferring agent with said anhydrous solvent to form the [$^{18}$F] fluoride complex is disclosed also.

Still another embodiment of the present invention is a kit for making [$^{18}$F] fluoride complexes in order to radiolabel to [$^{18}$F] fluorinated species. This is achieved by:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex is disclosed as well.

DETAILED DESCRIPTION OF THE INVENTION

Nucleophilic fluorination of glucose to form (2-[$^{18}$F] fluoro-2-deoxy-D-glucose) ("[$^{18}$F] FDG") requires anhydrous conditions. Accordingly, [$^{18}$F] fluoride must be separated from [$^{18}$O] water. Currently, the only way to achieve [$^{18}$F] FDG by anhydrous conditions is by an ion-exchange process where the [$^{18}$F] fluoride is first retained on an anion-exchange resin and is then eluted off in an aqueous-solvent mixture containing a cryptand. This solvent mixture containing the cryptand is then evaporated to dryness prior to the fluorination step. A cryptand is a phase-transfer agent used to improve the solubility of [$^{18}$F] fluoride in non-aqueous environments. Furthermore, the requirement for some water to be present in the elution of [$^{18}$F] fluoride from the resin results in longer times for the evaporation step. All such time delays reduce both the yield of [$^{18}$F] FDG and a rapid separation of [$^{18}$F] fluoride into a totally anhydrous solvent.

The current invention sets forth several advantages over previous methods. The main purpose of this invention is to isolate $^{18}$F at a carefully controlled electrode surface which minimises impurities. The electrode surface properties are more carefully controlled than those at bare metal surfaces and the fluoride-cryptate is eluted in more anhydrous solvent, making the drying process faster.

The present invention utilizes alternative electrode materials that can be tailored to inhibit electrochemical reactions with precursors. Additionally, unlike previous methods, the present invention demonstrates fluorination reactions that could be performed within the electrochemical chamber provided the precursors withstand the low applied electric fields.

Additional characteristics that are important factors favoring the present inventions methods over previous methods include the fact that mass transport of [$^{18}$F] fluoride to and from the polymer is quick and [$^{18}$F]fluoride is easily extracted from [$^{18}$O]water into the oxidised polymer layer. This can be achieved by ensuring that entrapment of fluoride is restricted to the outer regions of the polymer. In other words, having spatial control of [$^{18}$F]fluoride within the polymer electrode is advantageous in the present invention.

Accordingly, there are ways of manipulating the polymer during manufacture of the polymer layers that can alter its morphology so as to encourage all activity to be focused in the outer regions. For example, during electropolymerization the degree of crosslinking could be increased. As a result, mass transfer deep into the polymer would become hindered. Second, the morphology of conducting polymer layers is very much influenced by the ions present during the electro-polymerisation. As the conducting polymer layers are made they are laid down on the electrode in the oxidised form. As a result, ions in the solution are incorporated into the layers as they are made. The size of these ions impart an "imprint" in the polymer which can persist even when the ions used during manufacture are later removed when the polymer layer is exposed to new solutions.

Below a detailed description is given of a method for preparing cryptate [$^{18}$F] fluoride complexes suitable for performing radiolabelling to [$^{18}$F] fluorinated species, an apparatus for preparing cryptate [$^{18}$F] fluoride complexes suitable for performing for radiolabelling to [$^{18}$F] fluorinated species as well as preparing a kit for cryptate [$^{18}$F] fluorinated species suitable for performing radiolabeling to [$^{18}$F] fluoride fluorinated species.

In one embodiment of the present invention a method for making [$^{18}$F] fluoride complexes comprises:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex is disclosed as well.

Yet, in a further embodiment of the present method the phase-transferring agent [$^{18}$F] fluoride-complex is used to radiolabel a [$^{18}$F] fluorinated species wherein the radiolabelled [$^{18}$F] fluorinated species is used as an imaging agent in a patient.

Still another embodiment of the present invention discloses the imaging agent as being viewed within a patient by an imaging technique such as a positron emission tomography ("PET") scanner.

A further embodiment of the present invention depicts a phase-transfer agent as being a cryptand.

Yet in another embodiment of the present inventive method, the polymer-modified electrode is a polyacetylene, polypyrrole, polythiophene, poly(alkyl-substituted thiophenes), polyselenophene, polyazulene, polycarbazole, polyindole, polypyrene, polytriphenylene, polyaniline, polyphenylene, polyparaphenylene, polyparaphenylene-sulfide, polyquinoline, poly(1,6-heptadiyne), poly-isothianaphthene or similar compounds.

Still a further embodiment of the present inventive method comprises the polymer-modified electrode being a polymer matrix with embedded redox centres, wherein polyvinylferrocene is an example. Additionally, the polymer modified electrode comprises redox polymers prepared from metal complexes either covalently attached to a polymer backbone, or are electrostatically entrapped within a polymer.

A further embodiment of the present invention depicts the electrode potential (wherein the overall process involves both anodic and cathodic potentials) in the range of about −2 volts to about 2 volts and wherein the anhydrous solvent is DMSO, acetonitrile, THF, ethanol, methanol, or a similar compound thereof.

Additionally, another embodiment of the present inventive method comprises the phase-transfer agent being a cryptand.

Yet another embodiment encompasses the polymer matrix comprising of a polymer electrode and an anhydrous solvent and wherein the electrode is planar or porous. Porous electrodes are flow-through electrodes that provide a much larger surface area than planar electrodes.

Still a further embodiment encompasses an apparatus for making [$^{18}$F] fluoride complexes in order to view radiolabelled [$^{18}$F] fluorinated species. This apparatus comprises:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex.

Yet another embodiment encompasses an apparatus claim wherein the polymer-modified electrode is a polyacetylene, polypyrrole, polythiophene, poly(alkyl-substituted thiophene), polyselenophene, polyazulene, polycarbazole, polyindole, polypyrene, polytriphenylene, polyaniline, polyphenylene, polyparaphenylene, polyparaphenylene-sulfide, polyquinoline, poly(1,6-heptadiyne), poly-isothianaphthene or similar compounds.

Still another embodiment of the apparatus entails the polymer-modified electrode as redox-polymer, such as polyvinylferrocene, or a similar compound.

Yet another embodiment of the present inventive apparatus depicts the phase-transferring agent [$^{18}$F] fluoride-complex being used to radiolabel a [$^{18}$F] fluorinated species wherein the radiolabelled [$^{18}$F] fluorinated species is used as an imaging agent in a patient.

A further embodiment of the present apparatus also depicts the imaging agent as being viewed within the patient by an imaging technique such as a PET scanner.

Additionally, a few other embodiments entail an apparatus claim wherein the electrode potential is in the range of about −2 volts to about 2 volts and wherein the anhydrous solvent is DMSO, acetonitrile, THF, ethanol, methanol, or a similar compound thereof.

Yet other embodiments of the present inventive apparatus is wherein the phase-transfer agent is a cryptand and wherein the polymer matrix comprises of a polymer electrode and an anhydrous solvent and wherein the electrode is planar or porous. Porous electrodes are flow-through electrodes that provide a much larger surface area than planar electrodes.

Still a further embodiment of the present invention is a kit for making [$^{18}$F] fluoride complexes suitable for performing radiolabelling reactions to form [$^{18}$F] fluorinated species. The kit comprising:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex.

Yet another embodiment of the kit claim is wherein the polymer-modified electrode is a polyacetylene, polypyrrole, polythiophene, poly(alkyl-substituted thiophene), polyselenophene, polyazulene, polycarbazole, polyindole, polypyrene, polytriphenylene, polyaniline, polyphenylene, polyparaphenylene, polyparaphenylenesulfide, polyquinoline, poly(1,6-heptadiyne), polyisothianaphthene or similar compounds thereof.

An additional embodiment of the kit claim encompasses a polymer-modified electrode that is a redox-polymer, such as polyvinylferrocene or a similar compound.

Yet a further embodiment of the present inventive kit encompasses the phase-transferring agent $^{18}$F fluoride-complex as being used to radiolabel a [$^{18}$F] fluorinated species wherein the radiolabelled [$^{18}$F] fluorinated species is used as an imaging agent in a patient.

An additional embodiment of the present kit depicts said imaging agent as being viewed with an imaging technique such as a PET scanner.

An additional kit claim of the present invention entails an anhydrous solvent that is DMSO, acetonitrile, THF, ethanol, methanol, or a similar compound thereof.

A further embodiment of the present inventive kit encompasses a phase-transfer agent that is a cryptand.

Yet a further embodiment of the present inventive kit is wherein the polymer matrix comprises of a polymer electrode and an anhydrous solvent and wherein the electrode is planar or porous. Porous electrodes are flow-through electrodes that provide a much larger surface area than planar electrodes.

Still in a further embodiment of the present invention, an imaging technique such as PET is to be used in the method, apparatus, and kit claims in order to view the radiolabelled [$^{18}$F] fluorinated species that are administered to a patient. The subsequent images of the patient developed with PET are used to evaluate a variety of diseases.

The diagnostic use of a [$^{18}$F] fluoride cryptate complex used for radiolabelling a [$^{18}$F] fluorinated species comprising:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex is also disclosed.

Still in a further embodiment of the present invention, an imaging technique such as PET is to be used through out the diagnostic use claims.

The diagnostic use of an apparatus for radiolabelling an [$^{18}$F] fluorinated species wherein the apparatus comprises:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex is disclosed as well.

The diagnostic use of a kit for radiolabelling a [$^{18}$F] fluorinated species wherein the kit comprises:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex is also disclosed.

A further embodiment of the present invention shows the use of a use of making [$^{18}$F] fluoride complexes comprising:

loading [$^{18}$O] water containing [$^{18}$F] fluoride into an electrochemical cell whereby either a conducting polymer modified electrode or a redox polymer electrode is held at anodic potentials wherein the anions present will be retained on either said conducting polymer electrode or said redox polymer electrode;

washing said electrochemical cell with an anhydrous solvent; next switching either one of said polymer electrodes to a reducing potential and all retained anions are expelled from the polymer matrix; then finally combining a phase transferring agent with said anhydrous solvent to form the [$^{18}$F] fluoride complex.

Another embodiment of the present invention presents the use of making [$^{18}$F] fluoride complexes, wherein the polymer-modified electrode is a polyacetylene, polypyrrole, polythiophene, poly(alkyl-substituted thiophene), polyselenophene, polyazulene, polycarbazole, polyindole, polypyrene, polytriphenylene, polyaniline, polyphenylene, polyparaphenylene, polyparaphenylenesulfide, polyquinoline, poly(1,6-heptadiyne), polyisothianaphthene or similar compounds thereof.

Yet a further embodiment of the present invention shows the use of making [$^{18}$F] fluoride complexes, wherein the polymer-modified electrode is a redox polymer, such as polyvinylferrocene, or a similar compound thereof.

A further embodiment of the present invention shows the use of making [$^{18}$F] fluoride complexes, wherein the phase-transferring agent [$^{18}$F] fluoride-complex is then used to radiolabel a [$^{18}$F] fluorinated species.

Still another embodiment of the invention depicts the use of making [$^{18}$F] fluoride complexes, wherein the radiolabelled [$^{18}$F] fluorinated species is used as an imaging agent in a patient.

Yet another embodiment of the present invention shows the use of making [$^{18}$F] fluoride complexes, wherein the imaging agent is viewed by an imaging technique.

A further embodiment of the present invention shows the use of making [$^{18}$F] fluoride complexes wherein the imaging technique is a PET scanner.

Still another embodiment of the present invention depicts the use of making [$^{18}$F] fluoride complexes, wherein the anhydrous solvent is DMSO, acetonitrile, THF, ethanol, methanol, or a similar compound thereof.

Another embodiment of the present invention shows the use of making [$^{18}$F] fluoride complexes, wherein the phase-transfer agent is a cryptand.

A further embodiment of the present invention shows the use of making [$^{18}$F] fluoride complexes, wherein the polymer matrix comprises of a polymer electrode and an anhydrous solvent.

Yet another embodiment of the present invention depicts the use of making [$^{18}$F] fluoride complexes, wherein the electrode is planar or porous.

SPECIFIC EMBODIMENTS, CITATION OF REFERENCES

The present invention is not to be limited in scope by specific embodiments described herein. Indeed, various modifications of the inventions in addition to those described herein will become apparent to those skilled in the art from the foregoing description. Such modifications are intended to fall within the scope of the appended claims.

What is claimed is:

1. A method for making [$^{18}$F] fluoride complexes comprising:

loading [$^{18}$O] water containing [$^{18}$F] fluoride into an electrochemical cell whereby either a conducting polymer modified electrode or a redox polymer electrode is held at anodic potentials wherein anions present will be retained on either said conducting polymer electrode or said redox polymer electrode;

washing said electrochemical cell with an anhydrous solvent; next switching said electrode to a reducing potential and all retained anions are expelled from the polymer electrode; then finally combining a phase transferring agent with said anhydrous solvent to form the [$^{18}$F] fluoride complex.

2. The method according to claim 1, wherein the phase-transferring agent [$^{18}$F] fluoride-complex is then used to radiolabel a [$^{18}$F] fluorinated species.

3. The method according to claim 2, wherein the radiolabeled [$^{18}$F] fluorinated species is viewed by an imaging technique.

4. The method according to claim 3, wherein the imaging technique is a PET scanner.

5. The method according to claim 1, wherein the polymer-modified electrode is a polyacetylene, polypyrrole, polythiophene, poly(alkyl-substituted thiophene), polyselenophene, polyazulene, polycarbazole, polyindole, polypyrene, polytriphenylene, polyaniline, polyphenylene, polyparaphenylene, polyparaphenylenesulfide, polyquinoline, poly(1,6-heptadiyne), polyisothianaphthene or similar compounds thereof.

6. The method according to claim 1, wherein the polymer-modified electrode is a polyvinylferrocene polymer with embedded redox centres.

7. The method according to claim 1, wherein the anhydrous solvent is DMSO, acetonitrile, THF, ethanol, methanol, or a similar compound thereof.

8. The method according to claim 1, wherein the polymer electrode is part of a polymer matrix comprising the polymer electrode and the anhydrous solvent.

9. An apparatus for making [$^{18}$F] fluoride complexes comprising:

loading [$^{18}$O] water containing [$^{18}$F] fluoride into an electrochemical cell whereby either a conducting polymer modified electrode or a redox polymer electrode is held at anodic potentials wherein anions present will be retained on either said conducting polymer electrode or said redox polymer electrode;

washing said electrochemical cell with an anhydrous solvent; next switching said electrode to a reducing potential and all retained anions are expelled from the polymer electrode; then finally combining a phase transferring agent with said anhydrous solvent to form the [$^{18}$F] fluoride complex.

10. The apparatus according to claim 9, wherein the polymer-modified electrode is a polyacetylene, polypyrrole, polythiophene, poly(alkyl-substituted thiophene), polyselenophene, polyazulene, polycarbazole, polyindole, polypyrene, polytriphenylene, polyaniline, polyphenylene, polyparaphenylene, polyparaphenylenesulfide, polyquinoline, poly(1,6-heptadiyne), polyisothianaphthene or similar compounds thereof.

11. The apparatus according to claim 9, wherein the polymer-modified electrode is a polyvinylferrocene polymer with embedded redox centres.

12. The apparatus according to claim 9, wherein the phase-transferring agent [$^{18}$F] fluoride-complex is then used to radiolabel a [$^{18}$F] fluorinated species.

13. The apparatus according to claim 12, wherein the radiolabeled [$^{18}$F] fluorinated species is viewed by an imaging technique.

14. The apparatus according to claim 13, wherein the imaging technique is a PET scanner.

15. The apparatus according to claim 9, wherein the anhydrous solvent is DMSO, acetonitrile, THF, ethanol, methanol, or a similar compound thereof.

16. The apparatus according to claim 9, wherein the polymer electrode is part of a polymer matrix comprising the polymer electrode and the anhydrous solvent.

17. A kit for making [$^{18}$F] fluoride complexes comprising:

loading [$^{18}$O] water containing [$^{18}$F] fluoride into an electrochemical cell whereby either a conducting polymer modified electrode or a redox polymer electrode is held at anodic potentials wherein anions present will be retained on either said conducting polymer electrode or said redox polymer electrode;

washing said electrochemical cell with an anhydrous solvent; next switching said electrode to a reducing potential and all retained anions are expelled from the polymer electrode; then finally combining a phase transferring agent with said anhydrous solvent to form the [$^{18}$F] fluoride complex.

18. The kit according to claim 17, wherein the polymer-modified electrode is a polyacetylene, polypyrrole, polythiophene, poly(alkyl-substituted thiophene), polyselenophene, polyazulene, polycarbazole, polyindole, polypyrene, polytriphenylene, polyaniline, polyphenylene, polyparaphenylene, polyparaphenylenesulfide, polyquinoline, poly(1,6-heptadiyne), polyisothianaphthene or similar compounds thereof.

19. The kit according to claim 17, wherein the polymer-modified electrode is a polyvinylferrocene polymer with embedded redox centres.

20. The kit according to claim 17, wherein the phase-transferring agent [$^{18}$F] fluoride-complex is then used to radiolabel a [$^{18}$F] fluorinated species.

21. The kit according to claim 17, wherein the anhydrous solvent is DMSO, acetonitrile, THF, ethanol, methanol, or a similar compound thereof.

22. The kit according to claim 17, wherein the polymer electrode is part of a polymer matrix comprising the polymer electrode and the anhydrous solvent.

* * * * *